Dec. 29, 1925.  1,567,863
H. R. SARGENT ET AL
HOUSE WIRING STRUCTURE
Filed Jan. 3, 1923  2 Sheets-Sheet 1
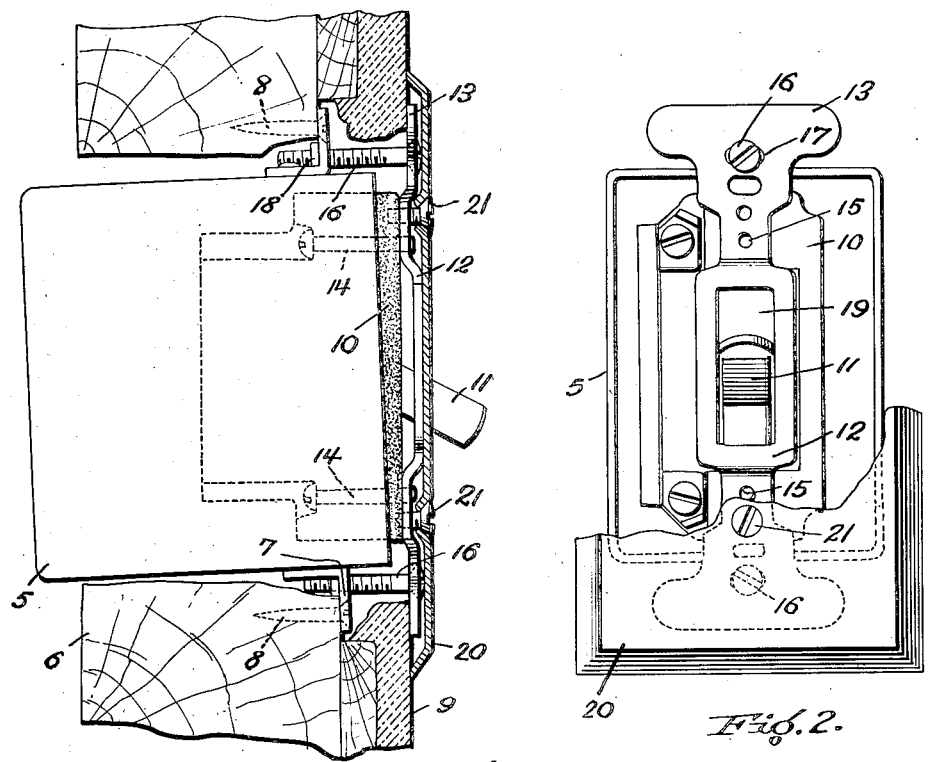
Fig.1.  Fig.2.
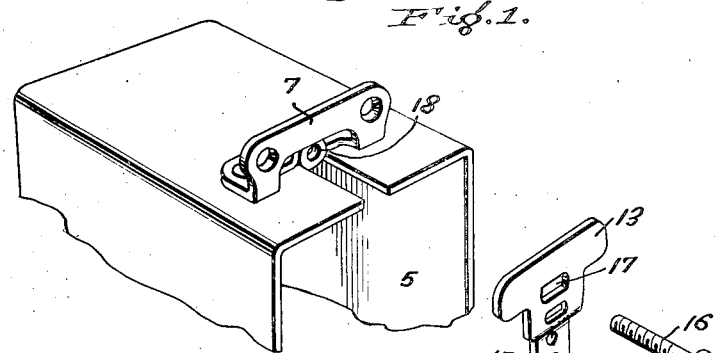
Fig.3.
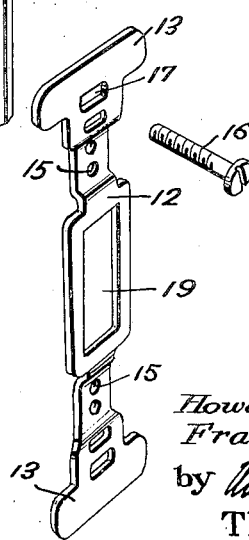
Inventors
Howard R. Sargent and
Frank C. DeReamer
by
Their Attorney Dec. 29, 1925.  1,567,863
H. R. SARGENT ET AL
HOUSE WIRING STRUCTURE
Filed Jan. 3, 1923  2 Sheets-Sheet 2
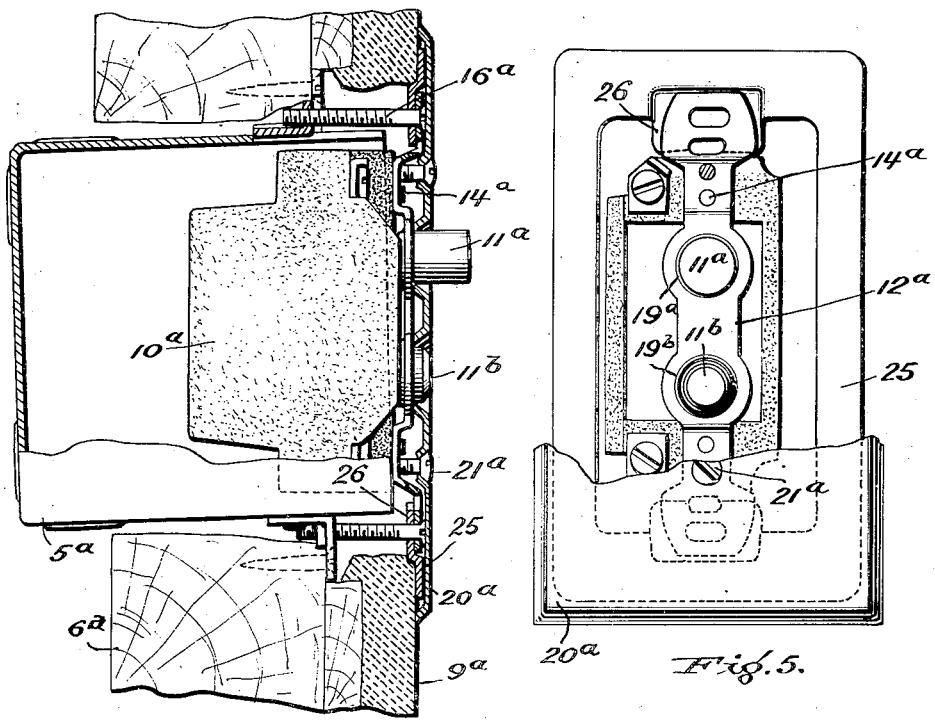
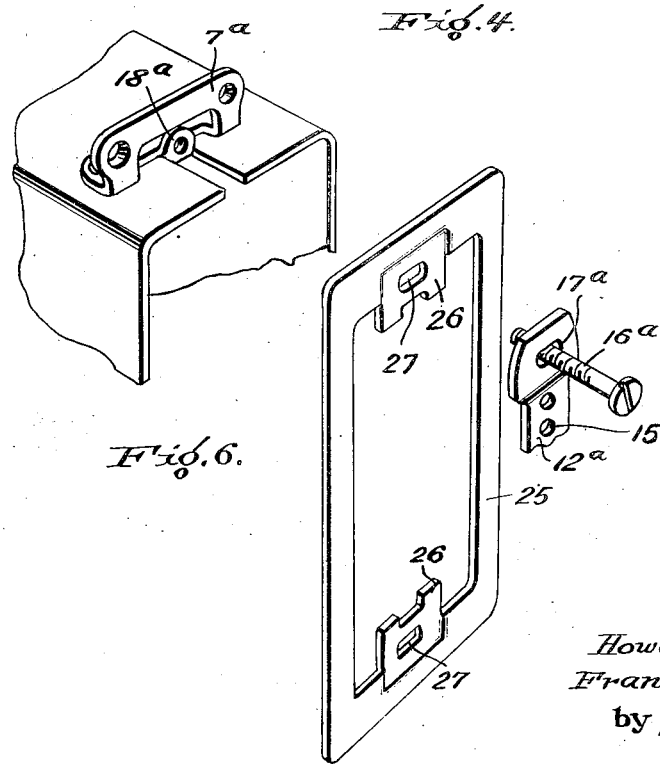
Inventors
Howard R. Sargent and
Frank C. De Reamer
by
Their Attorney, Patented Dec. 29, 1925.

1,567,863

UNITED STATES PATENT OFFICE.

HOWARD R. SARGENT AND FRANK C. DE REAMER, OF BRIDGEPORT, CONNECTICUT, ASSIGNORS TO GENERAL ELECTRIC COMPANY, A CORPORATION OF NEW YORK.

HOUSE-WIRING STRUCTURE.

Application filed January 3, 1923. Serial No. 610,496.

*To all whom it may concern:*

Be it known that we, HOWARD R. SARGENT and FRANK C. DE REAMER, citizens of the United States, residing at Bridgeport, county of Fairfield, State of Connecticut, have invented certain new and useful Improvements in House-Wiring Structures, of which the following is a specification.

The present invention relates to house wiring and particularly to the mounting of switches or other electrical wiring devices, such as plug receptacles for example, in outlet boxes. In wiring houses the outlet boxes are usually fastened to the studding before the building is lathed and plastered and it often happens that boxes are set crooked so that the plane of the box opening is not parallel to the plane of the plaster surface. As a result when the switch or other device is mounted on the box it will stand crooked with respect to the plaster surface which means of course that the switch is not straight.

The object of our invention is to provide an improved structure or arrangement wherein the switch will always come parallel with the plaster surface irrespective of the manner in which the box is set, and for a consideration of what we believe to be novel and our invention, attention is directed to the accompanying description and the claims appended thereto.

In the drawing, Fig. 1 is a side elevation, partly in section of a structure embodying our invention; Fig. 2 is a front view thereof, Fig. 3 is an exploded view of certain parts, and Figs. 4, 5 and 6 are views similar to Figs. 1, 2 and 3 of a modification.

Referring to the drawing, 5 indicates an outlet box mounted in a wall 6, being fastened in place by ears 7 and screws 8 in the usual manner. 9 indicates the plaster surface or wall surface and for purposes of illustration the box is shown as being mounted in the wall crooked. 10 indicates a switch to be mounted in the box, a switch of the tumbler type being illustrated. The handle of the switch is indicated at 11.

Now, according to the form of our invention shown in Figs. 1 to 3, we provide a supporting member 12 for the switch having integral projections, parts or ears 13 which when member 12 is fastened to the box overlie or take against the surface of the wall so as to hold the switch straight with the wall irrespective of the position of the box. The switch is fastened to supporting member 12 by screws 14 which enter tapped openings 15 in the member, and the supporting member is fastened to the box by screws 16 which pass through openings 17 in member 12 and enter tapped openings in box lugs 18.

In making an installation the switch is first fastened to the supporting member by the screws 14 which means of course, that the switch is straight with the supporting member. The supporting member is then fastened to the box by screws 16, the switch being in the box with its handle 11 projecting through opening 19 in the supporting member. As clearly shown in Fig. 1, when the switch is mounted in the box projections 13 engage the wall surface so as to hold supporting member 12 straight with the wall, and when screws 16 are tightened up the supporting member is pulled tightly against the wall surface. By this means the switch is lined up with the wall surface and not with the plane of the box opening. This means that the switch is straight with the wall surface so that when the face plate indicated at 20 is fastened in place by screws 21, the switch handle will stand correctly in the opening in the face plate.

In Figs. 4, 5 and 6 is shown another embodiment of our invention wherein the projections or parts which overlie the wall surface are formed as a separate piece fastened to the switch or switch supporting member. It is shown in the form of a rectangular frame 25 having sunken ears 26 provided with openings 27 through which the screws which fasten the supporting member to the box pass, these screws thus serving to fasten both elements in position. Otherwise the parts are in substance the same as those of Figs. 1, 2 and 3 and corresponding reference numerals with the exponent "a" added have been used to designate corresponding parts. In this modification a switch of the push button type is shown, the buttons being indicated $11^a$ and $11^b$ and the openings in the supporting member through which they project $19^a$ and $19^b$. The face plate $20^a$ is provided with two spaced openings (not shown) for the two buttons in the ordinary and well known manner.

In connection with each of the arrangements illustrated, it will be noted that no extra screws are required for holding the parts which overlap the wall, such parts being held by screws already required in connection with the structure. This is an important consideration for it means that no extra work is required by the factory in originally assembling the structure. As a result, a structure embodying the invention may be provided at small additional cost. In addition, the structure possesses particular utility from the standpoint of the user in that the arrangement simplifies the work of the wireman and saves considerable time for him.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States, is:—

1. The combination with a wall, and an outlet box fastened directly in the wall, of an electrical device in the box, means providing lugs at the ends of the device, fastening means in the lugs which attach the latter to the box for supporting the device in the box, and projecting means associated with said lugs and fastening means and adapted to overlie the wall at the edge of the box for holding the electrical device in alignment with the wall.

2. The combination with a wall, and an outlet box fastened directly in the wall, of an electrical device in the box, means providing lugs at the ends of the device, fastening means in the lugs which attach the latter to the box for supporting the device in the box, and projecting means carried by the outer ends of said lugs adapted to overlie the wall at the edge of the box for holding the electrical device in alignment with the wall.

3. The combination with a wall, and an outlet box fastened directly in the wall, of an electrical wiring device in the box, means carried by the device and projecting beyond it to provide attaching members, fastening means in said members which attach them to the box for supporting the device in the box, and ears formed integral with said members and overlying the wall at the edge of the box for holding said electrical wiring device in alignment with the wall.

4. In combination, an electrical wiring device comprising supporting means which projects beyond the ends of the device and is provided with openings for use in mounting the device in an outlet box, and parts carried by said supporting means and extending beyond the confines thereof, said parts being adapted to engage the surface of a wall when the device is fastened in an outlet box in the wall.

5. In combination, an electrical wiring device comprising projecting supporting means having openings to receive fastening means for mounting the device in an outlet box, and parts formed integral with said supporting means and extending beyond the confines thereof, said parts being adapted to engage the surface of a wall when the structure is fastened in an outlet box in the wall.

6. In combination, an electrical wiring device, supporting means projecting beyond its ends and provided with openings to receive fastening means for mounting it in an outlet box, and ears formed integral with said supporting means and adapted to engage the surface of a wall when the device is mounted in an outlet box in the wall.

7. A cross bar for an electrical wiring device for use in mounting it in an outlet box, said cross bar being provided with openings in its ends to receive fastening means for attaching the device to an outlet box, and projecting ears carried by the cross bar at its two ends and extending beyond said openings.

8. A cross bar for an electrical wiring device for use in mounting it in an outlet box, said cross bar being provided with openings at its ends to receive fastening screws for attaching the device to an outlet box, and having ears formed integral with it at its ends and extending beyond said openings.

9. Means for use in mounting an electrical device in an outlet box, including an attachment lug having an opening to receive a fastening means for attaching it to an outlet box and being provided at one side of said opening with means for use in attaching it to an electrical device and at the other side of said opening with projecting wall engaging means.

In witness whereof, we have hereunto set our hands this 20th day of December 1922.

HOWARD R. SARGENT.
FRANK C. DE REAMER.